(12) United States Patent
Mercat et al.

(10) Patent No.: US 12,344,353 B2
(45) Date of Patent: Jul. 1, 2025

(54) GEAR MOTOR AND ASSOCIATED CYCLE

(71) Applicant: MAVIC GROUP, Chavanod (FR)

(72) Inventors: Jean-Pierre Mercat, Chavanod (FR); Bérenger Alexandre, Pringy (FR)

(73) Assignee: MAVIC GROUP, Chavanod (FR)

( * ) Notice: Subject to any disclaimer, the term of this patent is extended or adjusted under 35 U.S.C. 154(b) by 467 days.

(21) Appl. No.: 18/046,776

(22) Filed: Oct. 14, 2022

(65) Prior Publication Data
US 2023/0119459 A1 Apr. 20, 2023

(30) Foreign Application Priority Data

Oct. 14, 2021 (FR) ...................................... 21 10905

(51) Int. Cl.
*B62M 6/55* (2010.01)
*B62M 11/14* (2006.01)

(52) U.S. Cl.
CPC ............ *B62M 6/55* (2013.01); *B62M 11/145* (2013.01)

(58) Field of Classification Search
CPC ........... B62M 6/55; B62M 11/145; F16H 1/32
See application file for complete search history.

(56) References Cited

U.S. PATENT DOCUMENTS

| | | | |
|---|---|---|---|
| 10,895,306 B2 | 1/2021 | Tamura et al. | |
| 2013/0045827 A1* | 2/2013 | Kobayashi | B62M 11/16 475/180 |
| 2016/0297500 A1* | 10/2016 | Dubose | F16H 49/001 |
| 2020/0025277 A1 | 1/2020 | Tamura et al. | |
| 2020/0325981 A1 | 10/2020 | Koop et al. | |

FOREIGN PATENT DOCUMENTS

| | | |
|---|---|---|
| CN | 208431359 U | 1/2019 |
| CN | 212429703 U | 1/2021 |
| FR | 3 091 516 A1 | 7/2020 |
| JP | 2014-214834 A | 11/2014 |

OTHER PUBLICATIONS

French Preliminary Search Report and Written Opinion issued May 23, 2023 in French Patent Application No. 2210298 (with English translation of Category of Cited Documents), 11 pages.
French Preliminary Search Report and Written Opinion Issued Jun. 13, 2022 in French Application 21 10905 filed on Oct. 14, 2021 (with English Translation of Categories of Cited Documents), 10 pages.

* cited by examiner

*Primary Examiner* — Christopher B Wehrly
(74) *Attorney, Agent, or Firm* — Oblon, McClelland, Maier & Neustadt, L.L.P.

(57) ABSTRACT

A gear motor of an electrical assistance device for a cycle is provided, including a gear reducer and an electric motor, which are configured to be fitted coaxially on a central shaft, the gear reducer including at least one planet wheel, which is fitted firstly on an eccentric cam, the planet wheel also having passing therethrough at least three shafts of the satellite-carrier, the at least three shafts including a respective peripheral surface configured to come into contact with a hole of the planet wheel, which surface is made of polymer material, and/or the at least one planet wheel is made of polymer material.

17 Claims, 9 Drawing Sheets

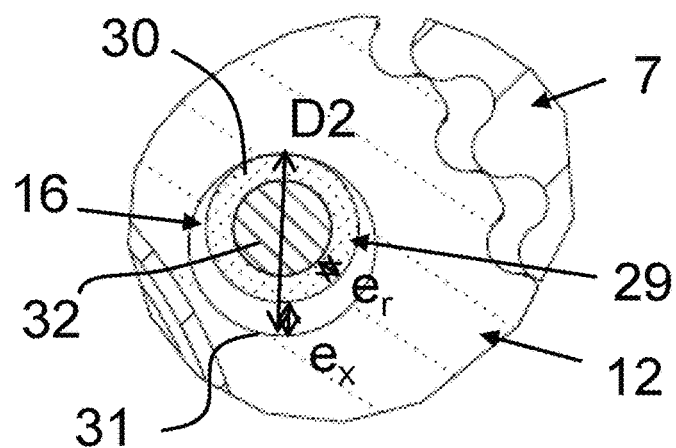
*FIG. 4B*
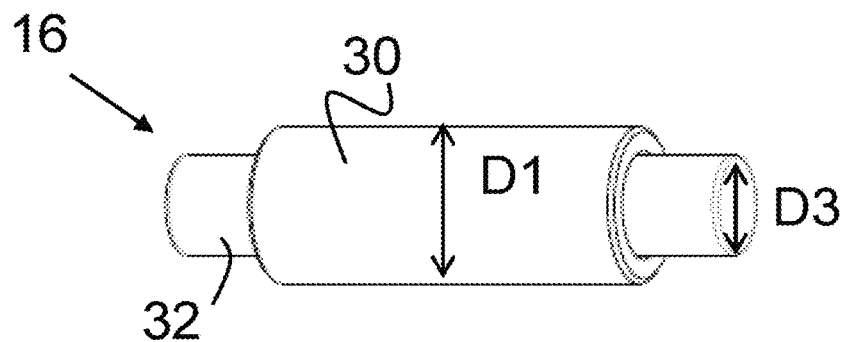
*FIG. 5*
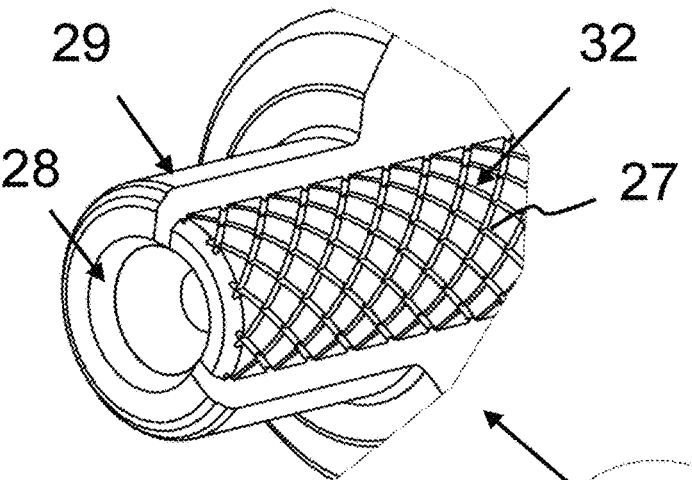
*FIG. 6*
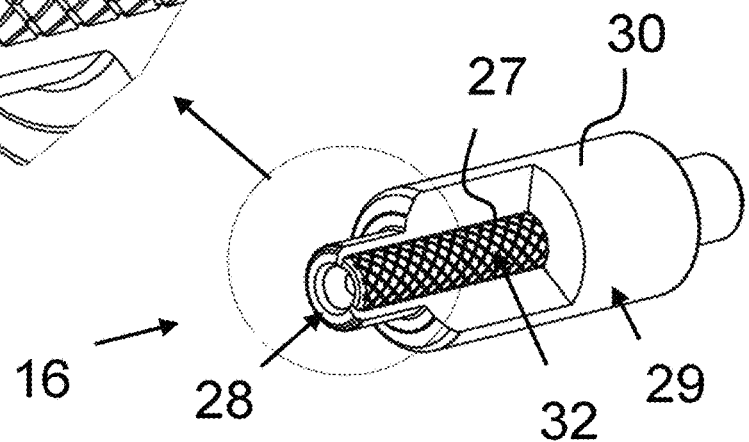

D1 (mm)

GEAR MOTOR AND ASSOCIATED CYCLE

TECHNICAL FIELD OF THE INVENTION

The invention concerns a gear motor, in particular for a cycle, as well as a cycle equipped with a gear motor of this type in order to provide electrical assistance with pedalling.

Electrical assistance cycle users are requiring increasingly very light and compact assistance motors in order to approximate the appearance and sensations of traditional, non-assisted bicycles. Also, very silent assistance motors are required in order to avoid disturbing cyclists seeking a quiet moment of relaxation.

Gear reducers of the cycloidal or epicycloidal type make it possible to obtain substantial reduction ratios in a small space.

The input and output shafts of most of these gear reducers are solid. However some of these gear reducers make it possible to transmit a movement of rotation between a hollow shaft and a coaxial hollow output flange, with the central orifice permitting passage of a shaft, such as a crank gear or a wheel shaft.

Document FR3091516 shows an example of a gear reducer of this type for a cycle comprising a plurality of planet wheels fitted on eccentric cams of the shaft via ball bearings. These planet wheels engage on a crown of the gear reducer. In a first configuration, the planet wheels have output shafts of a satellite-carrier which forms the output of the gear reducer passing through them. In a second possible configuration, the crown forms the output of the gear reducer.

A disadvantage of these gear reducers is that they are subjected to substantial radial forces, which are exerted on the planet wheels in particular as a result of the high output torque. The use of a plurality of planet wheels with phase-shifted rotation makes it possible to compensate for the forces exerted. However, this compensation for the stresses may not be perfectly balanced. Consequently, the slightest difference of positioning of the parts relative to one another can give rise to a pressure point or blockage, and to imbalance creating a resulting superfluous radial load on the ball-bearings which support the shaft and rotate at high speed. This radial load creates a friction torque which reduces the performance of the gear reducer considerably.

The planet wheels, which are eccentric relative to the shaft, are subjected to stress at the level of contact of the toothing with the crown, but also in cylindrical holes through which there pass a plurality of shafts of the satellite-carrier, which rotates without sliding, thus making it possible to synchronise the rotational phase-shifting of the pinions, and ensure transfer of output torque from the eccentric pinions to the satellite-carrier which is coaxial with the shaft and with the crown of the gear reducer. These contacts require a sufficient level of hardness of the shafts and of the associated cylindrical holes. For this purpose, metal pinions and metal shafts are used.

However, this form has the disadvantage that the contacts at the level of the toothing and at the level of the cylindrical holes in contact with their respective rotary shafts which transfer the output torque to the satellite-carrier, can be relatively noisy.

In addition, the simultaneous contacts of these different shafts can make the system profoundly hyperstatic. Satisfactory operation of an assembly of this type requires greatly reduced production tolerances, which can have a significant effect on the production costs as a result of the need to use precise and expensive technologies.

These same problems can arise for other apparatuses which use electrical assistance devices, such as, for example, exoskeletal electric assistance devices, portable electrical equipment, or robotisation arms, where the operating noise and compactness are important criteria.

SUMMARY OF THE INVENTION

An objective of the present invention is to remedy the aforementioned disadvantages at least partly. In particular, an objective of the present invention is to provide a solution making it possible to reduce the noise emitted by a particularly compact and light gear motor.

For this purpose, the subject of the invention is a gear motor of an electrical assistance device, in particular for a cycle, comprising a gear reducer and an electric motor which are configured to be able to be fitted coaxially on a central shaft, the electric motor comprising a rotor which is integral in rotation with a shaft forming the input of the gear reducer, the gear reducer comprising a toothed crown, a satellite-carrier comprising at least one flange, at least one planet wheel, which is fitted firstly on an eccentric cam via a bearing, the eccentric cam being integral with the shaft, the at least one planet wheel also having passing through it at least three shafts of the satellite-carrier which are fitted such as to pivot relative to the at least one flange, the at least one planet wheel engaging on the toothed crown, characterised in that the at least three shafts comprise a respective peripheral surface coaxial with the axis of rotation of the shaft, which surface is configured to come into contact with a hole of the at least one planet wheel, and is made of polymer material, and/or the at least one planet wheel is made of polymer material.

The metal-metal contact between the shafts and the planet wheel according to the prior art is replaced by a metal-plastic or plastic-plastic contact, which makes it possible to reduce the maximum contact pressure (or Hertz pressure) to within the permissible limit, by reducing the modulus of elasticity (or Young's modulus) of the peripheral surface of the shafts and/or of the planet wheel. Reducing the rigidity of the contacts decreases the degree of hyperstatism of the assembly, which makes it possible to render its operation less noisy and more tolerant. In addition, the vibrations are reduced and the phenomenon of friction corrosion is avoided (which can be found at the interface of contact of two metal parts), as is therefore the wear. When the planet wheel and the peripheral surface of the shafts are made of polymer material, the noise is reduced further.

The origin of the noise emitted by a gear motor of this type is very complex to identify, in particular when this gear motor is incorporated in an electrical assistance bicycle. When the gear motor generates an assistance torque, it then generates mechanical excitation, which in principle can be measured on the six components (three forces and three moments) of the torsor of the mechanical actions of the connection between this gear motor and the frame. In practice, it is very complicated to produce this type of force sensor, and it is far simpler to monitor the vibrations emitted by measuring the torsor of the accelerations as close as possible to the gear motor, and installing accelerometers there. These vibrations emitted will then be transmitted to the frame and to the different elements of the bicycle, which will then begin to resonate when these vibrations are close to the own frequencies or their harmonic multiples. This phenomenon is comparable to a musical instrument, where the excitation can be derived for example from the mechanical excitation of a string, which will then be transformed into a sound (acoustic pressure) by the amplification of this excitation by means of many resonances of the case of the instrument, which form the identity and the power of this instrument. By means of frequential analysis tools, it is possible to analyse the excitation signal emitted at the level of accelerometers which are glued onto a gear motor, and to analyse in parallel the sound emitted by means of a microphone (acoustic pressure sensor) positioned in the region where it is wished to measure this noise, preferably close to the ears of the user. When analysis is carried out of the relationship of transfer between the vibratory excitation and the sound perceived by the microphone, it is found that there is good correlation between the two, with a high response of the own modes of the frame, which shows that firstly, it is necessary to decrease the source of excitation, but also prevent the own resonance modes of the frame from having powerful excitation passing through them, and for these modes to be sufficiently damped to be attenuated, and sufficiently high for them not to be too much in the audible domain. In order to understand well the origins of the mechanical excitation of this type of a gear motor, the inventors carried out experiments on a gear motor in conformity with the second embodiment proposed in patent FR 3091516 (in the name of the applicant), varying the speed of the motor slowly, and measuring the level of frequential excitation in dB for different ranges of assistance torque. This experiment showed that high power lines exist on the harmonics of order six and twelve times the speed of the motor, which corresponds to the number (and its double for twelve) of the output shafts, of which there are in fact six in this embodiment. This experimental finding is explained by a mechanical factor, since at each rotation of the drive shaft, each of the two pinions will transfer torque in succession to the six output shafts, and it is thus at the level of this contact that a large part of the excitation will be generated six or twelve times per revolution. It was not at all apparent to discover that this source of excitation contributed so much to the global excitation. Tests were carried out incorporating shafts comprising a contact surface made of polymer material, which tests showed strong attenuation of the harmonics of orders six and twelve, which contributed strongly to the level of global excitation, also with a significantly lower level of noise perceived on a bicycle in operation.

The gear motor can also comprise one or a plurality of the characteristics described hereafter, taken alone or in combination.

The polymer material of the peripheral surfaces of the shafts and/or of the at least one planet wheel can be a thermoplastic material, such as a "PEEK" polyetheretherketone material or "PAI" polyamide-imide or "PPS" polyphenylenesulphide, or "POM" polyoxymethylene.

The polymer material can also be a heat-setting polymer such as an epoxide polymer (also known as "epoxy" or "epoxy resin").

These materials are cited by way of non-limiting examples. More generally, the polymer material has for example a Young's modulus (modulus of elasticity) lower than 15000 MPa, such as lower than 5000 MPa.

The decrease in rigidity of the contacts can take place by use of thermoplastic materials, which are so-called high performance, in particular since they withstand relatively high contact pressures at operating temperatures which can be as much as 80 or 90° C. Numerous polymer materials, and more particularly the thermoplastic materials PEEK or PAI, make it possible to conserve their properties at high temperature, and are not sensitive to creeping. They can withstand mechanical stresses and high temperatures, without losing their resilience.

The peripheral surface of each shaft is cylindrical. It can be configured to roll without sliding in the holes of the planet wheel.

According to one embodiment of the shaft, each shaft is a bi-material shaft comprising a central metal needle, which for example is made of steel, sheathed at least on the peripheral surface by a sheath made of polymer material. The shaft thus has good mechanical strength, in particular in relation to shearing and flexure, thus making it possible to transfer the output torque of the gear reducer. In addition, the metal needles can be obtained with very close production tolerances, which is recommended in order to control well the adjustment necessary for their insertion in the bores of the two shaft bearings situated at each of the cylindrical ends of the shaft. Metal needles which are made of high-mechanical-resistance hardened steel are available on the market at a lower cost, since these are standardised parts.

The radial thickness of the sheath can be greater than 0.5 mm, for example greater than 1 mm. It can be less than 6 mm, for example less than 3 mm. A thickness of sheath of less than 0.5 mm could tear, it would have much less potential for reducing the vibrations and controlling the hyperstatism, and would not withstand the alternating stresses to which it is subjected during its rotation under load. Above 6 mm, the planet wheel could be too weakened, with excessively large holes which would make it necessary to increase substantially the diameter of the planet wheel, and consequently the diameter of the toothed crown, and thus the dimensions of the gear reducer.

In this embodiment, the mechanical needle and its sheath are integral. A very slight gap can however appear between the mechanical needle and the sheath during use, in particular in the case of initial clamped or shrunk initial fitting of the sheath. It is considered however that, in this embodiment, the connection between the metal needle and the sheath is complete, and is not a pivot connection.

The sheath made of polymer material forming the peripheral surface of the shafts can be over-moulded onto the metal needles, or it can be fitted shrunk onto the metal needles.

The sheath made of polymer material can over-mould only the peripheral surface, leaving the cylindrical ends of the metal needle on view.

According to another example, the sleeve made of polymer material over-moulds the outer surface of the metal needles entirely, as far as the cylindrical ends of the metal needle. In this case, the metal needle makes it possible to reinforce the shaft, and the shaft bearings can be fitted on each of the cylindrical ends made of polymer material, and not on a metal needle. This solution makes it possible to produce a bi-material shaft very economically, while guaranteeing very good coaxiality between the different diameters of bearing surface and peripheral surface, with the different diameters being able to be moulded simultaneously.

In addition, the cylindrical ends made of polymer material make it possible to increase the tolerance interval of the two bearing surfaces, without risking stressing the two shaft bearings excessively radially, which facilitates the production of the shaft and makes it more economical. The tolerance of the bearing surfaces can be increased in comparison with a shaft with metal cylindrical ends, and can for example go up to a tolerance interval of 0.03 mm (instead of 2 µm).

Knurling or striations can be provided on the metal needle, at least below the sleeve made of polymer material, or on the entire outer surface of the metal needles, when the sheath over-moulds the outer surface of the metal needles entirely, in order to anchor the over-moulding well. The metal needle is then no longer a standard bearing needle.

According to another embodiment, the at least three shafts are made entirely of polymer material. The polymer material of the shaft can be fibre-reinforced, in order to reinforce its mechanical strength, for example with carbon fibres or glass fibres.

When the at least three shafts comprise a respective peripheral surface made of polymer material, the at least one planet wheel can be made of polymer material or of metal material. When it is made of metal material, the at least one planet wheel can be obtained by sintering of metal powder which can be made of steel or brass or bronze, with the advantage of having a limited coefficient of thermal expansion, and of being able to produce this part economically and precisely.

When the planet wheels are made of polymer or thermoplastic material, such as a PEEK or PAI material, the peripheral surfaces of the shafts can be made of polymer material, or the shafts can be made of metal, such as aluminium.

The shafts can be shouldered, and have respectively a peripheral surface with an intermediate diameter which is larger than the diameters of the cylindrical ends. The shouldered shafts make it possible to decrease the contact pressure, by reduction of the relative difference of diameters between the shaft and the cylindrical hole at the level of the peripheral surface of the shafts, which makes it possible to keep the shafts at the cylindrical ends fine on both sides of the cylindrical surface. The dimensions of the gear reducer can thus be limited, while maximising the diameter of the shafts. With a larger intermediate diameter with a peripheral surface made of polymer or thermoplastic material, the contact pressure is decreased, firstly by increasing the radius of curvature in contact, and secondly by decreasing the modulus of elasticity of the material, with these two factors combined resulting in a solution which is advantageous in terms of wear and noise generated.

The diameter of the peripheral surface of the shafts (i.e. the sleeve made of polymer material in the case of bi-material shafts) is for example 1.4 times or more the diameter of the cylindrical ends of the shafts (i.e. with the metal material in the case of bi-material shafts leaving the cylindrical ends of the metal needle on view).

In the case of shouldered bi-material shafts, where the metal needle forms the cylindrical ends with a smaller diameter $D3$, and the sleeve made of polymer material forms the peripheral surface with a diameter $D1$, the ratio $D1>1.4*D3$ makes it possible to define a minimal thickness of sleeve, making possible a damping height which is sufficient for reduction of the noise.

The gear motor can comprise one pair of shaft bearings per shaft, with a shaft bearing being fitted at each cylindrical end of the shafts. The shaft bearings make it possible to ensure that the shafts roll without sliding in the holes of the planet wheel.

In the case of shouldered shafts, the shaft bearings can then have small dimensions, and thus be integrated well in the two flanges of the satellite-carrier. The outer diameter of the flanges can thus be smaller than the inscribed diameter of the toothed crown of the gear reducer, in order to permit fitting of the satellite-carrier through the toothed crown, the outer diameter of which is limited so that the gear reducer remains very compact.

The shaft bearings can be fitted clamped at each cylindrical end of the shafts, and, if applicable, abutting the sheath made of polymer material axially on both sides of the sheath, when the sheath made of polymer material leaves the cylindrical ends of the metal needle on view. This fitting makes it possible to ensure very good axial retention of the sheath, and makes it possible to avoid any contact wear between the shaft and the inner rings of the shaft bearings.

In the case of shafts which are made entirely of polymer material, they can be shouldered to lower the contact pressure by reduction of the relative difference in diameters between the shaft and the cylindrical hole at the level of the peripheral surface of the shafts. The diameter of the peripheral surface of the shafts is for example 1.4 times the diameter of the cylindrical ends of the shaft.

In addition, in the case when the gear reducer comprises two or three planet wheels, the mechanical actions of the planet wheels on the shaft which provide the transfer of torque to the satellite-carrier induce strong flexure stresses on the shafts (bending moment for two pinions), and these stresses can be better withstood by the shouldered shafts because of the increase in diameter in the central area.

The gear reducer comprises six shafts for example.

The gear reducer comprises for example a single planet wheel or two planet wheels with rotation phase-shifted by 180°, or three planet wheels which are phase-shifted relative to one another by 120°.

The satellite-carrier can be coupled in rotation to the output of the gear reducer.

According to another example, the toothed crown is coupled in rotation to the output of the gear reducer.

The subject of the invention is also a gear motor of an electrical assistance device, in particular for a cycle, which is independent from that previously described, and the protection of which may be required separately, without connection to the gear motor described above.

This gear motor comprises a gear reducer and an electric motor which are configured to be able to be fitted coaxially on a central shaft, the electric motor comprising a rotor integral in rotation with a shaft forming the input of the gear reducer, the gear reducer comprising:

a toothed crown;
a satellite-carrier comprising at least one flange;
at least one planet wheel which is fitted firstly on an eccentric cam via a bearing, the eccentric cam being integral with the shaft, the planet wheel also having passing through it at least three hollow cylinders of the satellite-carrier, which are fitted such as to pivot around a respective cylindrical section of the satellite-carrier, which is integral with the at least one flange, the at least one planet wheel engaging on the toothed crown, each hollow cylinder being coaxial with the axis of a cylindrical section, each hollow cylinder being made of polymer material, the respective peripheral surface of the hollow cylinders being configured to come into contact with a hole of the planet wheel.

The gear motor can also comprise one or a plurality of the characteristics which are described hereinafter, taken alone or in combination.

The polymer material of the hollow cylinders is for example a thermoplastic material, such as a "PEEK" polyetheretherketone material or a "PAI" polyamide-imide, or "PPS" polyphenylenesulphide or "POM" polyoxymethylene material. The polymer material can also be a thermosetting polymer such as an epoxide polymer (also known as "epoxy" or "epoxy resin"). These materials are cited by way of non-limiting examples. More generally, the polymer material has for example a Young's modulus (modulus of elasticity) lower than 15000 MPa, such as lower than 5000 MPa.

The at least one planet wheel can also be made of polymer material. Alternatively, the at least one planet wheel can be made of metal material, for example by sintering of metal powder which can be made of steel or brass or bronze, with the advantage of having a limited coefficient of thermal expansion, and of being able to produce this part economically and precisely.

Each hollow cylinder can be configured to roll without sliding in the holes of the planet wheel.

A radial functional gap of a few hundredths of millimetres is left between the cylindrical section and the hollow cylinder made of polymer material, in order to permit the free rotation of the hollow cylinder forming a smooth bearing. The hollow cylinder thus ensures a function of a bearing in addition to the function of a damping roller, in order to reduce the vibrations and noise emitted in its contact without sliding with the at least partly cylindrical holes of each of the planet wheels. This embodiment has the advantage of not needing the two shaft bearings, with the hollow cylinder being able to pivot around a respective cylindrical section because of the smooth bearing.

The hollow cylinders can have respectively a peripheral surface with a diameter which is greater than, or equal to, the product of the inner diameter of the hollow cylinder times 1.4. This ratio makes it possible to define a minimal hollow cylinder thickness which permits a height of damping sufficient for reduction of the noise.

In addition, with a large peripheral surface diameter made of polymer or thermoplastic material, the contact pressure is decreased, firstly by increasing the radius of curvature in contact, and secondly by decreasing the modulus of elasticity of the material, with these two factors combined resulting in a solution which is advantageous in terms of wear and noise generated.

The radial thickness of the hollow cylinder is for example greater than 1 mm. It can be less than 6 mm, such as, for example, less than 3 mm.

Since the braces of the previous embodiments, connecting the two flanges of the satellite-carrier, are no longer necessary, it is thus possible to increase easily the number of hollow cylinders in a single gear reducer space. The increase in the number of hollow cylinders makes it possible to limit their unit load, and thus limit their wear.

This embodiment is very economical, but the performance of the gear reducer can be downgraded as a result of the losses generated by the friction of the smooth bearings.

The gear reducer comprises for example a single planet wheel or two planet wheels which are phase-shifted in rotation by 180°, or three planet wheels which are phase-shifted relative to one another by 120°.

The satellite-carrier can be coupled in rotation to the output of the gear reducer.

According to another example, the toothed crown is coupled in rotation to the output of the gear reducer.

The subject of the invention is also any apparatus comprising an electrical assistance device comprising a gear motor such as those previously described, such as an exoskeleton, a portable electrical device or a robotisation arm.

In particular, the subject of the invention is also a cycle comprising an electrical assistance device, characterised in that the electrical assistance device comprises a gear motor such as those previously described, configured to be fitted in a crank gear of the cycle, on a central shaft of the crank gear, or in a rear hub of the cycle, on the central shaft of a cycle wheel.

BRIEF DESCRIPTION OF THE FIGURES

Other advantages and characteristics will become apparent from reading the following description of a particular embodiment of the invention which is in no way limiting, as well as from the appended drawings, in which:

FIG. 4B is a view of the detail C of FIG. 4A.

FIG. 5 shows a view in perspective of a shaft of the gear motor of FIG. 3.

FIG. 6 shows a variant embodiment of a shaft of the gear motor with a portion seen in cross-section and an enlarged detail of the shaft.

DETAILED DESCRIPTION

The following embodiments are examples. Although the description refers to one or a plurality of embodiments, this does not necessarily mean that each reference concerns the same embodiment, or that the characteristics apply only to a single embodiment. Simple characteristics of different embodiments can also be combined or interchanged to provide other embodiments.

Figure 1:
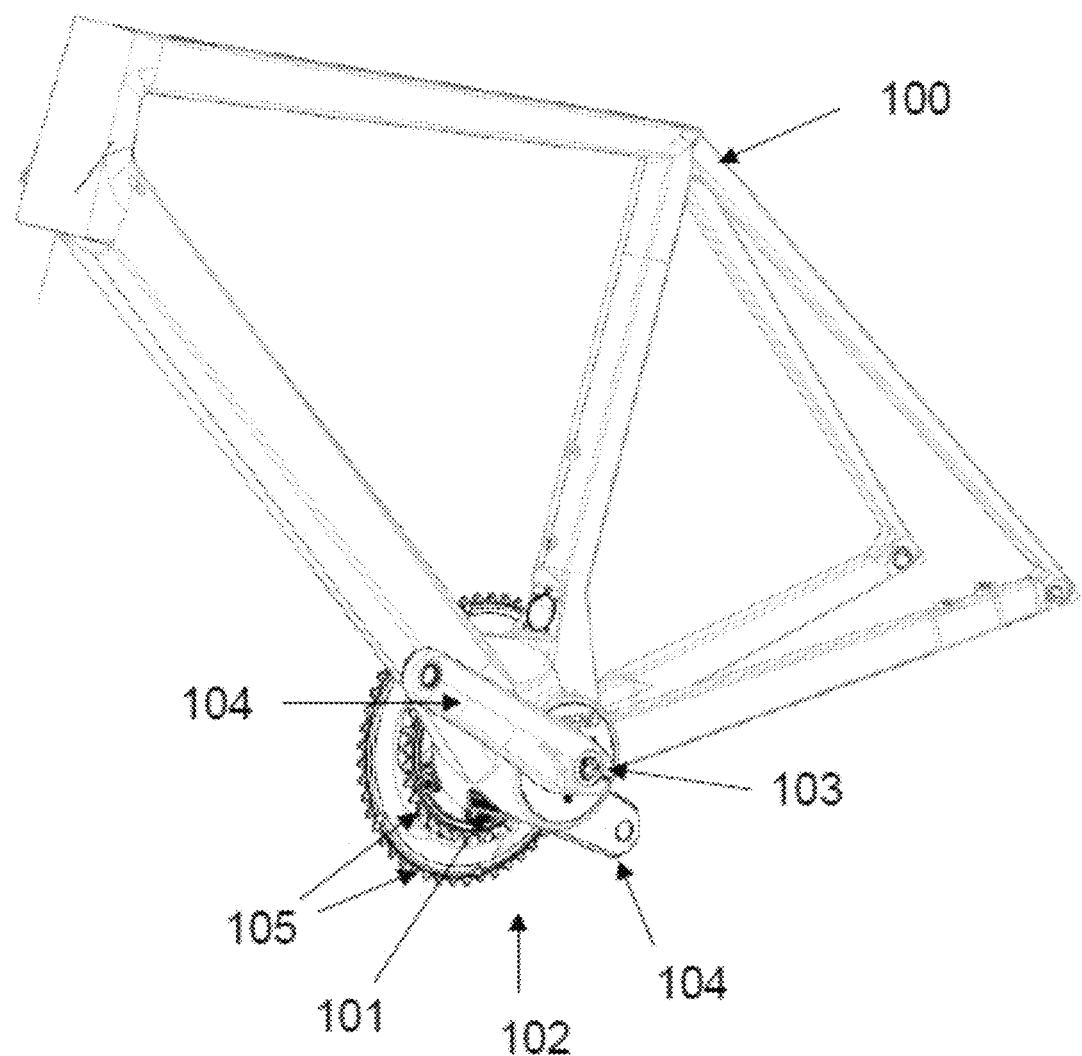
FIG. 1 shows an electrical assistance device comprising a gear motor fitted in a crank gear of a cycle.

FIG. 1 shows a frame 100 of a cycle comprising an electrical assistance device 101.

Figure 2:
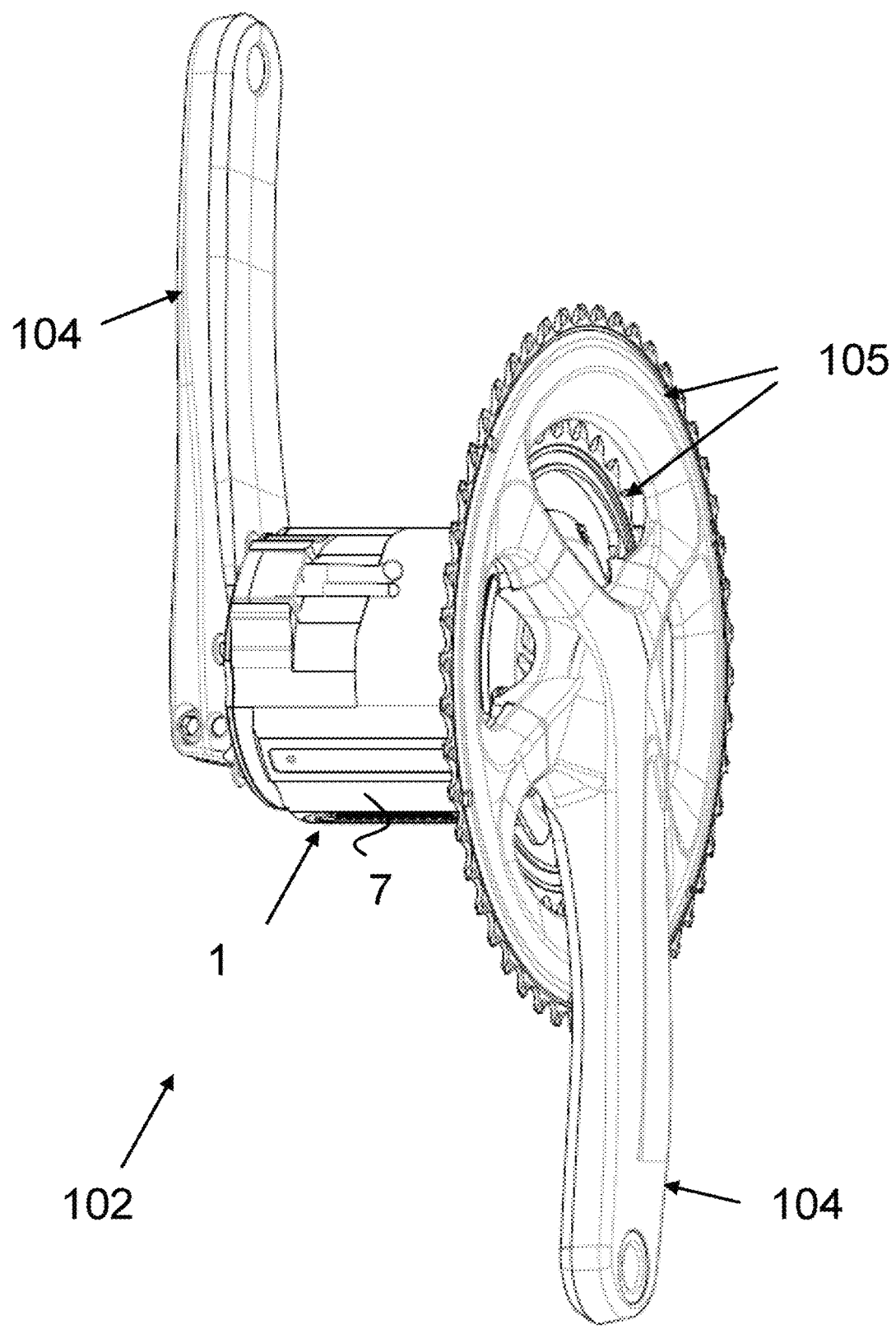
FIG. 2 shows a view in perspective of the crank gear of FIG. 1.

The electrical assistance device 101 comprises a gear motor 1 fitted in a crank gear 102 of the cycle, on the central shaft 103 of the crank gear, in a receptacle of the frame 100 (FIGS. 1 and 2).

In a known manner, the central shaft 103 of the rotary crank gear is connected to the pedals (not represented) via two cranks 104. The crank gear 102 also comprises at least one toothed plate 105, in this case two, secured on the base of one of the cranks 104 and configured to drive the chain which drives the rear wheel of the cycle.

Figure 3:
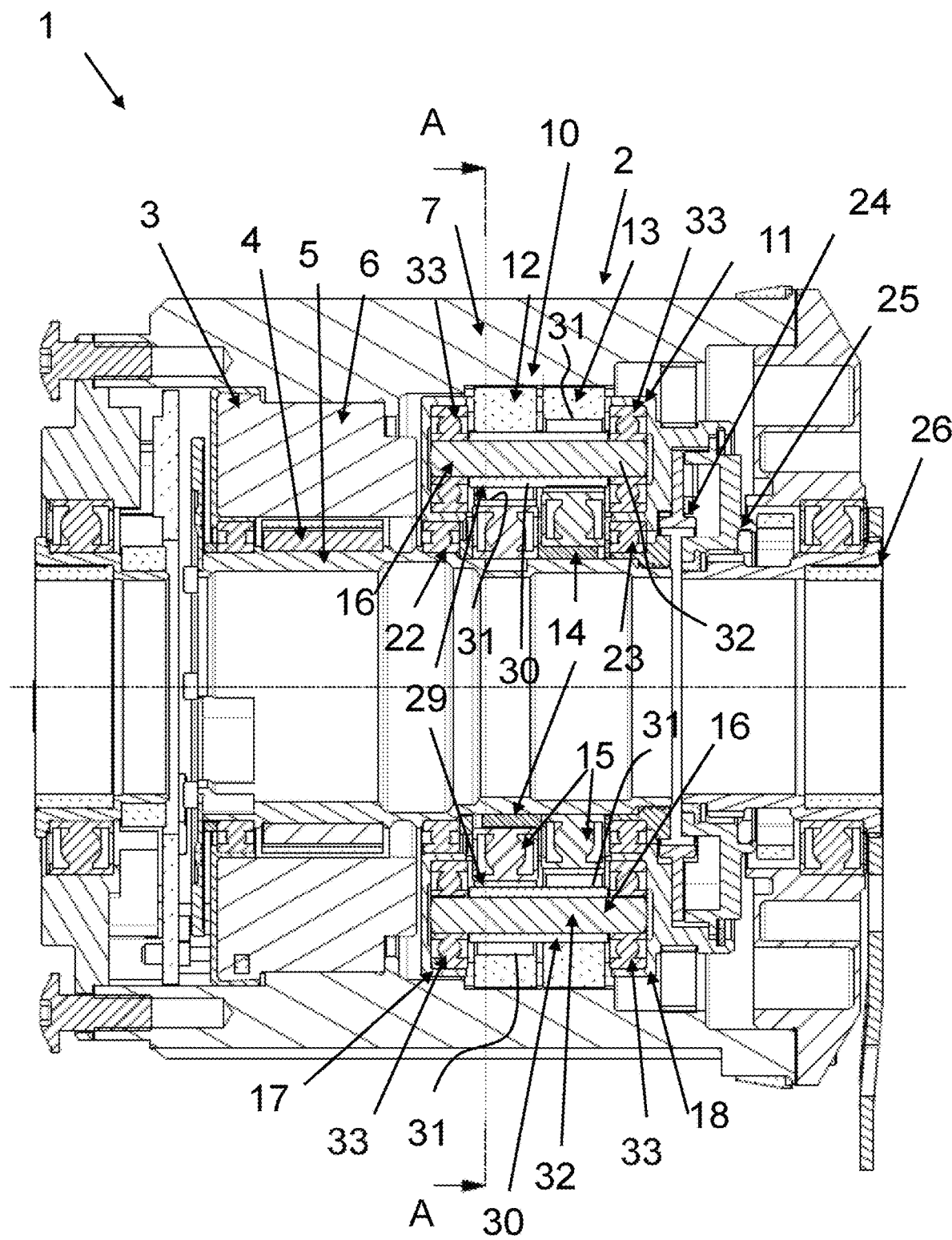
FIG. 3 shows a view in axial cross-section of the gear motor of the electrical assistance device of FIG. 1.

Shown more clearly in the view in axial cross-section of FIG. 3, the gear motor 1 comprises a gear reducer 2 and an electric motor 3 which are configured to be able to be fitted coaxially on the central shaft 103.

The electric motor 3 comprises a rotor 4 which is integral in rotation with a shaft 5 and a stator 6 which is secured in a housing 7 of the gear motor 1, the housing 7 itself being received and secured in the frame 100.

The electric motor 3 is for example a brushless motor, the rotor 4 comprising permanent magnets which rotate in the interior of the stator 6 comprising windings, which for example are three-phase. The permanent magnets of the rotor 4 are secured on the shaft 5. Sensors for the angular position of the rotor 4 and the central shaft 103 of the crank gear 102 also make it possible to control the electric motor 3.

The shaft 5 is tubular, i.e. hollow, in order to permit the passage of the central shaft 103, which in this case is connected to the cranks 104. It forms the input of the gear reducer 2.

The gear reducer 2 comprises a toothed crown 10, a satellite-carrier 11, and at least one eccentric planet wheel 12, 13.

The gear reducer 2 can comprise a single planet wheel, or two planet wheels 12, 13 which are phase-shifted by 180° (FIG. 3), or three planet wheels which are phase-shifted relative to one another by 120° (not represented). The use of a plurality of planet wheels 12, 13 which are phase-shifted in rotation makes it possible to compensate for the radial forces exerted in particular on the satellite-carriers 12, 13 as a result of the high output torque.

In the illustrative example, the gear reducer 2 comprises two planet wheels 12, 13 which are phase-shifted in rotation by 180°. The planet wheels 12, 13 are situated on two parallel planes. The toothed crown 10 engages the two planet wheels 12, 13 in two different planes on the inner side of the toothed crown 10.

The planet wheels 12, 13 are fitted firstly on respective eccentric cams 14 via a respective bearing 15, and also have at least three shafts 16 of the satellite-carrier 11 passing through them. The gear reducer 2 comprises for example six shafts 16. The eccentric cams 14 are integral with the shaft 5.

The gear reducer 2 is of the cycloidal type, and makes it possible to reduce the speed of the shaft 5 with a relatively high ratio in relatively compact dimensions. The shaft 5 drives the eccentric bearings 15, which in turn drive the planet wheels 12, 13 in an eccentric cycloidal movement.

The planet wheels 12, 13 engage on the toothed crown 10 while being phase-shifted in rotation. The planet wheels 12, 13 comprise teeth with a truncated cycloidal form (or toothing developing in a circle), in this case 45 teeth, and the toothed crown 10 comprises teeth, in this case 46, having portions of cylinder which cooperate with the form of the pinions 12, 13. This toothing with a truncated cycloidal form can be seen in FIGS. 4A and 4B.

The satellite-carrier 11 comprises at least one flange 17, 18.

Figure 4A:
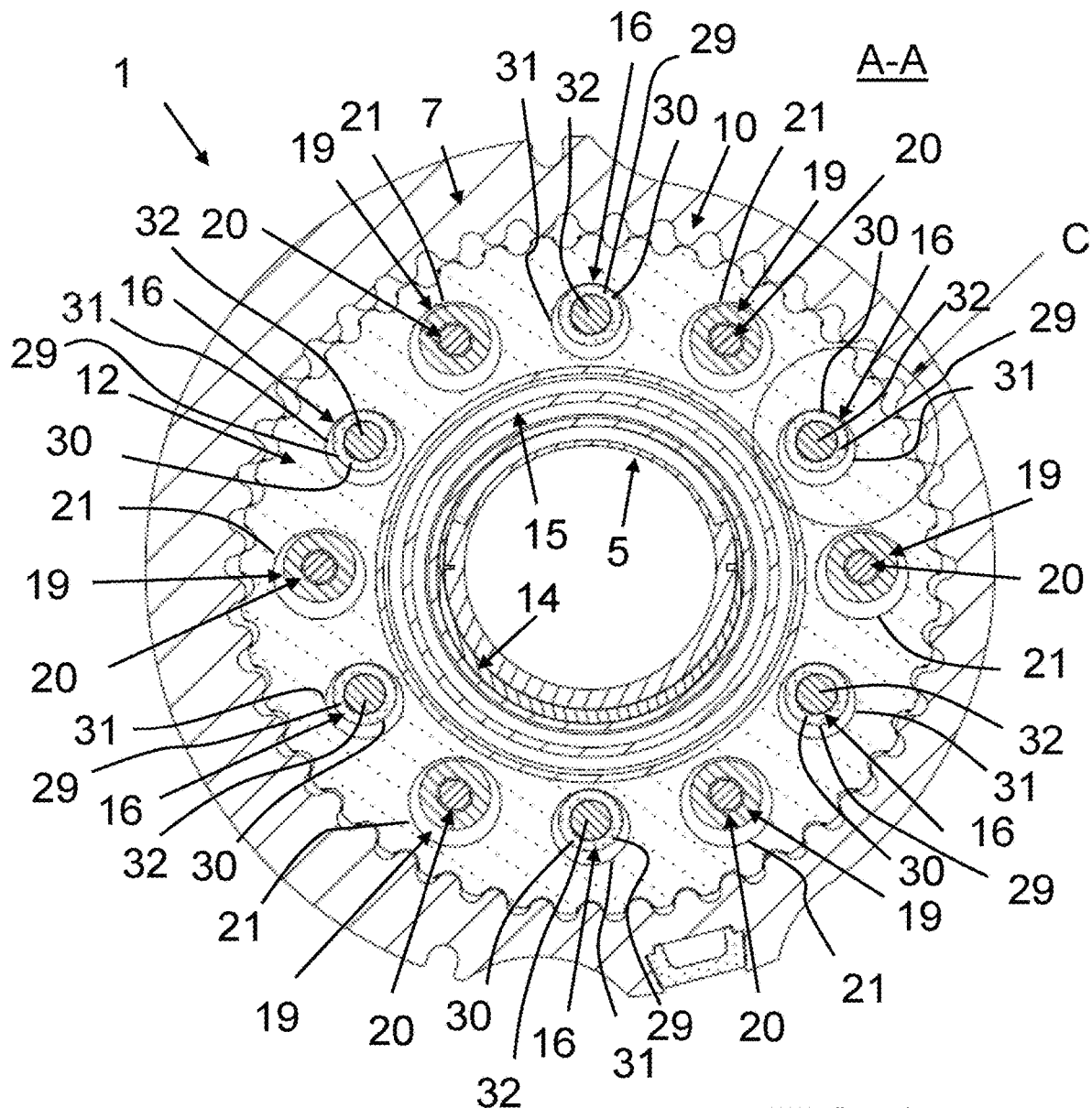
FIG. 4A shows a view in transverse cross-section A-A of the gear motor of FIG. 3.

According to one embodiment, the satellite-carrier 11 comprises a first flange 17 and a second flange 18, which are connected to one another by a series of braces 19 (at least three), for example six braces 19 (shown in the view in transverse cross-section of FIG. 4A). These braces 19 are secured in each of the flanges 17, 18 by screws 20 which pass through the braces 19 (one screw 20 per brace 19) connecting the two flanges 17, 18. The shafts 16 are fitted such as to pivot relative to the flanges 17, 18 of the satellite-carrier 11. The planet wheels 12, 13 are axially interposed between the flanges 17, 18, with the satellite-carrier 11 thus forming a cage coaxially with the shaft 5 and with the toothed crown 10 for the planet wheels 12, 13 which are moved out of centre by the eccentric cams 14.

The braces 19 pass through the planet wheels 12, 13 through openings 21, in this case six of them (as many openings 21 as there are braces 19), which for example are cylindrical. There is a sufficient gap between the braces 19 and the openings 21 for them not to come in contact with one another. The openings 21 are regularly formed on a circle in the faces of the planet wheels 12, 13.

The gear reducer 2 can also comprise a first flange bearing 22 interposed between the first flange 17 of the satellite-carrier 11 and the shaft 5, in order to centre the first flange 17, and a second flange bearing 23 interposed between the second flange 18 of the satellite-carrier 11 and the shaft 5, in order to centre the second flange 18.

The output torque of the gear reducer 2 is transmitted to the central shaft 103 of the crank gear by means of a rotatable coupling, for example an Oldham seal 24, making it possible to transmit the torque while tolerating slight radial offsetting. A free wheel 25 can be interposed between the output shaft 26 connected to the toothed plate 105 of the cycle and the output of the Oldham seal 24, as described for example in document FR3088696. The free wheel 25 is it possible in particular to uncouple the gear motor 1 in the case of an excessively high speed, or in the case of back-pedalling or reversing, or when the cyclist no longer requires assistance.

In a first possible configuration represented in FIGS. 3 and 4, the satellite-carrier 11 is coupled in rotation to the output of the gear reducer 2.

In this case, the toothed crown 10 is secured on the housing 7 of the gear motor 1. The toothing of the crown 10 is for example produced directly in the housing 7. The pinions 12, 13 are engaged on the "fixed" toothed crown 10.

The shafts 16 passing through the faces of the planet wheels 12, 13 thus form the output of the gear reducer. The shafts 16, or output shafts in this case, rotate the output of the gear reducer 2, coaxially with the shaft 5, when the planet wheels 12, 13 rotate. The direction of rotation of the planet wheels 12, 13 and of the output is opposite that of the shaft 5, and when the shaft 5 rotates by one turn, the planet wheels 12, 13 are offset angularly by one tooth in the other direction, driving the output at a speed of rotation which is lower than the speed of rotation of the shaft 5, in this case 45 times lower.

The shafts 16 pass through all the planet wheels 12, 13. Each shaft 16 is in contact with a hole 31 of each planet wheel 12, 13, i.e. two holes 31 in the case of a gear reducer 2 with two planet wheels 12, 13. Since the shafts 16 are cylindrical, the holes 31 must comprise at least one cylindrical portion in the direction which transmits the torque. The holes 31 are for example cylindrical.

The shafts 16 roll without sliding in these holes 31.

The holes 31 of the planet wheels 12, 13 are regularly arranged in the faces of the planet wheels 12, 13, on a circle, with the holes 31 alternating with the openings 21 into which the braces 19 pass (FIG. 4A).

The at least three shafts 16 comprise a respective peripheral surface 13 which is cylindrical and coaxial with the axis of rotation of the shaft 16. In other words, the axis of the peripheral surface 30 coincides with the axis of rotation of the shaft 16. The peripheral surface 30 which is configured to come into contact with a preferably cylindrical hole 31 of the planet wheels 12, 13 is made of polymer material, and/or the planet wheels 12, 13 are made of polymer material.

When the at least three shafts 16 comprise a respective peripheral surface 30 made of polymer material, the planet wheels 12, 13 can be made of metal, such as steel or brass, or they can also be made of polymer material.

When the planet wheels 12, 13 are made of polymer or thermoplastic material, such as PEEK or PAI material, the peripheral surfaces 30 of the shafts 16 can be made of polymer material, or the shafts 16 can be made of metal, such as aluminium.

The metal-metal contact between the shafts and the planet wheels according to the prior art is replaced by a metal-plastic or plastic-plastic contact, which makes it possible to reduce the maximal contact pressure (or Hertz pressure) to within the admissible limit, by decreasing the Young's modulus of the outer surface of the shaft 16 and/or of the planet wheels 12, 13. Decreasing the rigidity of the contacts reduces the degree of hyperstatism of the assembly, which makes it possible to render its operation less noisy and more tolerant. In addition, the vibrations are reduced, and the phenomenon of friction corrosion is avoided (which may take place at the contact interface of two metal parts), and thus so is the wear. When the planet wheels 12, 13 and the peripheral surfaces 30 of the shafts 16 are made of polymer or thermoplastic material, the noise is reduced further.

The polymer material of the peripheral surfaces 30 of the shafts 16 and/or of the planet wheels 12, 13 is for example a thermoplastic material, such as a PEEK or PAI or "PPS" polyphenylenesulphide or "POM" polyoxymethylene material. According to another example, the polymer material is a thermosetting polymer such as an epoxide polymer (also known as "epoxy" or "epoxy resin"). The modulus of elasticity of the PEEK material is 4300 MPa (at 20° C.), the PAI has a modulus of elasticity of 4200 MPa (at 20° C.) and the epoxide polymers have a modulus of elasticity of between 3000 MPa and 4500 MPa, these values being able to vary according to any mixed fillers.

In the case of thermoplastic materials such as a PEEK or PAI material, the decrease in rigidity of the contacts is thus obtained through the use of so-called high-performance thermoplastic materials, in particular in order to withstand relatively high contact pressures at operating temperatures which can reach 80 or 90° C. Many polymer materials, and more particularly PEEK or PAI thermoplastic materials, make it possible to maintain their properties at high temperature, and are not sensitive to creeping. They can withstand mechanical and temperature stresses without losing their resilience.

According to a first embodiment of the shaft, shown in the view in transverse cross-section of FIGS. 4A and 4B, each shaft 16 is a bi-material shaft comprising a central metal needle 32, which for example is made of steel and is for example cylindrical, the metal needle 32 being sheathed at least on the peripheral surface 30 by a sheath 29 made of polymer material. The peripheral surface 30 of the sheath 29 is coaxial with the axis of rotation of the shaft 16, and thus in this case with the metal needle 32.

In this embodiment shown in FIGS. 4A, 4B, 5 and 6, the metal needle 32 and the sheath 29 are integral. A very slight gap may however appear during use between the metal needle 32 and the sheath 29, in particular in the case of initial clamped or shrunk fitting of the sheath 29, the connection being considered however as complete.

The sheath 29 made of polymer material forming the peripheral surface 30 of the shafts 16 is for example over-moulded on the metal needles 32. This embodiment makes it possible to embed the sheath well with its metal needle 32.

The sheath 29 made of polymer material can over-mould only the peripheral surface 30, leaving the cylindrical ends of the metal needle 32 on view (FIG. 5).

According to another embodiment, the sheath 29 made of polymer material forming the peripheral surface 30 of the shafts 16 is fitted shrunk (diametral clamping) on the metal needles 32. In this case, the sheath 29 made of polymer material is produced separately, and is then assembled by shrinking onto the metal needle 32. By way of illustration, the sheath 29 is shrunk with clamping of 1% of the diameter, with the diameter of the bore of the sheath 29 being 3.96 mm on a metal needle 32 which is 4 mm in diameter.

The shaft 16 thus has good mechanical resistance, in particular against shearing and flexure, thus making it possible to transfer the output torque of the gear reducer 2 derived from the thrust of each of the pinions 12, 13. In addition, the metal needles 32 can be obtained with very close production tolerances (class of 2 μm tolerance in the diameter), which is recommended in order to control well the adjustment necessary for their insertion in the bores of the two shaft bearings 33 situated at each of the cylindrical ends of the shaft 16. Metal needles 32 made of hardened steel with high mechanical strength are available on the market at a lower cost since they are standardised parts, used for example for the production of needle bearings.

According to another example, the sheath 29 made of polymer material over-moulds entirely the outer surface of the metal needle 32, as far as the cylindrical ends of the metal needle 32, as illustrated in FIG. 6. In this case, the metal needle 32 makes it possible to reinforce the shaft 16, and the two shaft bearings 33 can be fitted onto each of the cylindrical ends made of polymer material, and not onto a metal needle 32.

This solution makes it possible to produce a bi-material shaft 16 very economically, while guaranteeing very good coaxiality between the different diameters D3 of bearing surface and D1 of peripheral surface, the diameters being moulded simultaneously.

In addition, the cylindrical ends made of polymer material make it possible to increase the tolerance interval of the two bearing surfaces without risking over-stressing the two shaft bearings 33 radially, which facilitates the production of the shaft 16 and makes it more economical. The tolerance of the bearing surfaces can be increased in comparison with a shaft 16 having metal cylindrical ends, and can go for example to 0.03 mm of tolerance interval (instead of 2 μm).

Knurling or striations 27 can be provided on the metal needle 32, at least below the sheath 29 made of polymer material, or on all the outer surface of the metal needles 32, when the sheath 29 over-moulds the outer surface of the metal needles 32 entirely, in order to anchor the over-moulding well (FIG. 6). The metal needle 32 is then no longer a standard bearing needle.

A description will now be provided an embodiment of the method for production of the shaft 16 with a sheath 29 made of polymer material over-moulded on the metal needles 32 as far as the cylindrical ends of the metal needle 32.

The metal needle 32 comprises for example two centre points 28 formed by frusto-conical surfaces at 60° provided in each cylindrical end, in order to permit its initial positioning by two centring points in the mould before the over-moulding.

The injection can then take place at one of the cylindrical ends of the metal needle 32, for example by means of a tubular injection nozzle, surrounding one of the centring points. A vent can be provided at the other end of the mould in order for the air to escape. Thus, the over-moulded shaft 16 does not have a welding line in a functional area.

In order to avoid flash on the joining plane of the mould in the functional areas of the shaft 16, the joining plane of the mould can be radial, i.e. positioned perpendicular to the shaft, and in the middle of the shaft 16. The flash of the joining plane is thus positioned between the two planet wheels 12, 13, in an area of non-functional gap of the shaft 16.

For the removal from the mould, the clearance can be very slight, since the removal of the polymer material contracts the diameters, thus permitting axial removal from the mould. It is also possible to compensate for this clearance by means of slightly conical holes 31 in the planet wheels 12, 13.

The bearing surfaces of the cylindrical ends and the peripheral surface 30 are perfectly coaxial, since they are moulded simultaneously. It is understood that all of the precision is provided by the quality of the mould, which can be very precise, and that it is possible to avoid costly reworking of the shaft 16, which can also generate coaxiality defects.

It is also possible to use a mould with an axial joining plane, i.e. which passes via the axis, with a risk of creating flash on the joining plane in a functional area, which flash must then be eliminated.

For an even more economic embodiment, it is possible to use wound bars to produce the metal needle 32, also known as "coiled wire", which bars can be knurled, striated or drawn. The wound bar is straightened before being introduced into a mould, where it is centred while being retained at both of its ends by tooling of the mould. The injection is then carried out around the bar, then the bar is cut into pieces or sawn on the side of the end which is still connected to the coil. Production of the metal needle 32 by this means has the advantage of not needing to reload the metal needle 32 before the over-moulding. This production method is semi-continuous. It is sufficient to advance the bar by one notch in the mould, with the notch corresponding to slightly more than the length of the metal needle 32. The metal needle 32 therefore does not need to comprise centre points.

The radial thickness $e_r$ of the sheath is for example greater than 0.5 mm, such as, for example, greater than 1 mm (FIG. 4B). It can be less than 6 mm, such as, for example, less than 3 mm. A thickness of sheath of less than 0.5 mm could tear, it would have much less potential for reducing the vibrations and controlling the hyperstatism, and would not withstand the alternating stresses to which it is subjected during its rotation under load. Above 6 mm, the planet wheel 12, 13 could be too weakened, with excessively large holes 31 which would make it necessary to increase substantially the diameter of the planet wheels 12, 13, and consequently the diameter of the toothed crown 10, and thus the dimensions of the gear reducer 2.

The contact pressure also decreases when the diameters of the shafts 16 and the cylindrical holes 31 are increased. In fact, the contact pressure between a shaft 16 with a radius R1 rolling in a cylindrical hole 31 with a radius R2 is proportional to 1/R1−1/R2, however with the difference between R2−R1 being equal to the off-centring $e_x$, in order to reduce the contact pressure it is advantageous to increase the radius R1 of the shaft 16, and thus the radius R2 of the cylindrical hole 31.

The difference of diameters, which is twice the difference of radii R2−R1 and thus twice the off-centring $e_x$, is for example between 1 mm and 3 mm, such as 1.4 mm. The diameter D1 of the shafts 16 at the level of the peripheral surfaces 30 (outer diameter) is for example 7.6 mm, and the diameter D2 of the cylindrical holes 31 is for example 9 mm (FIG. 4B). This difference of diameters can nevertheless be greater, as will be seen hereinafter when the gear motor 1 is fitted in the rear hub.

As can be seen better in FIGS. 3 and 5, the shafts 16 can be shouldered. They have respectively a peripheral surface 30 with an intermediate diameter D1 larger than the diameters D3 of the cylindrical ends. A diameter D3 of 4 mm of the cylindrical ends is compatible with standard shaft bearings 33, and is sufficiently robust to transfer the load, but not too large for the gear reducer 2 to remain compact.

The diameter D1 of the peripheral surface 30 of the shafts 16 is for example greater than, or equal to, 1.4×D3, the diameter of the cylindrical ends of the shaft 16.

In the case of shouldered bi-material shafts 16, i.e. comprising respectively a metal needle 32 which is sheathed at least on the peripheral surface 30 by a sheath 29 made of polymer material, the ratio D1>1.4*D3, or in other words a radial thickness $e_r$ greater than 0.2×D3 (since $e_r$=(D1−D3)/2), makes it possible to define a minimal thickness of sheath permitting a height of damping which is sufficient for a reduction of the noise.

In the illustrative example of a bi-material shaft 16 which leaves the cylindrical ends of the metal needle 32 on view (FIG. 5), the metal needle 32 has a diameter D3 of 4 mm, the sheath has a diameter D1 of 7.6 mm, and the radial thickness $e_r$ of sheath is thus 1.8 mm, i.e. in this case D1=1.9×D3. The coefficient of 1.9, greater than 1.4, and the radial thickness $e_r$, greater than 0.5 mm thus limit the risk of tearing described above.

The shouldered shafts 16 make it possible to decrease the contact pressure by reduction of the relative difference in diameters between the shaft 16 and the cylindrical hole 31 at the level of the peripheral surface 30 of the shafts 16, which makes it possible to keep the shafts 16 at the cylindrical ends fine on both sides of the peripheral surface 30. The size of the gear reducer 1 can thus be limited, while maximising the diameter of the shafts 16.

With a larger intermediate diameter D1 of peripheral surface 30 made of polymer or thermoplastic material, the contact pressure is decreased, firstly by increasing the radius of curvature in contact, and secondly by decreasing the modulus of elasticity of the material, with these two factors combined resulting in a solution which is advantageous in terms of wear and noise generated.

More specifically, the Hertz theory makes it possible to calculate the maximal contact pressure $P_{MAX}$ exerted at the interface between two cylinders with parallel axes with interior contact, i.e. a shaft 16 with a diameter D1 inserted in a cylindrical hole 31 with a diameter D2:

$$P_{Max} = \sqrt{\frac{k.F}{L} \cdot \frac{\frac{1}{D_1} - \frac{1}{D_2}}{\frac{1}{E_1} + \frac{1}{E_2}}}$$

where k is a constant, F is the normal force, L is the width of the contact, D1 is the outer diameter of the shaft 16, D2 is the diameter of the cylindrical holes 31 of the planet wheels 12, 13, E1 is the Young's modulus of the polymer of the sheath 29, and E2 is the Young's modulus of the planet wheel 12, 13.

Since the relative difference of the diameters D1 and D2 is twice the off-centring $e_x$ of the planet wheels 12, 13 of the gear reducer 2, it can be written that D2−D1=2$e_x$.

It is deduced from this that:

$$P_{Max} = \sqrt{\frac{k.F}{L} \cdot \frac{\frac{2ex}{2ex + D_1}}{\frac{1}{E_1} + \frac{1}{E_2}}}$$

By applying this formula to the example illustrated, for which the off-centring $e_x$ is 0.7 mm, the increase in the diameter D1 from 4 mm to 7.6 mm makes it possible to reduce the contact pressure by 40%, or to increase the load by 67% for the same contact pressure, thus making it possible to improve the strength of this connection considerably.

Similarly, when the influence of the Young's modulus of the materials in contact is studied, it is noticed that a solution comprising a shaft 16 and a planet wheel 12, 13 made of steel generates a contact pressure which is 50 times greater than a solution having a shaft 16 and planet wheel 12, 13 made of PEEK thermoplastic. Certainly, the pressure admissible by a polymer material is clearly lower than that of a steel, but this change of material remains highly advantageous for of the robustness of the system.

Thus, the combination of the increase in the diameter of the shouldered shaft 16 combined with the use of polymer material makes it possible to reduce the contact pressure considerably, while creating a very compact and robust connection.

Similarly, the change of material and decrease in the Young's moduli makes it possible to reduce the rigidity of the contact, and thus to tolerate minor defects which will be levelled out by the local deformation of the contact, thus making it possible to control better the hyperstatism inherent in this gear reducer design, and thus decrease the vibrations generated by the irregularities of contacts, therefore making it possible to obtain a silent system necessary for cycling quietly.

Figure 7:
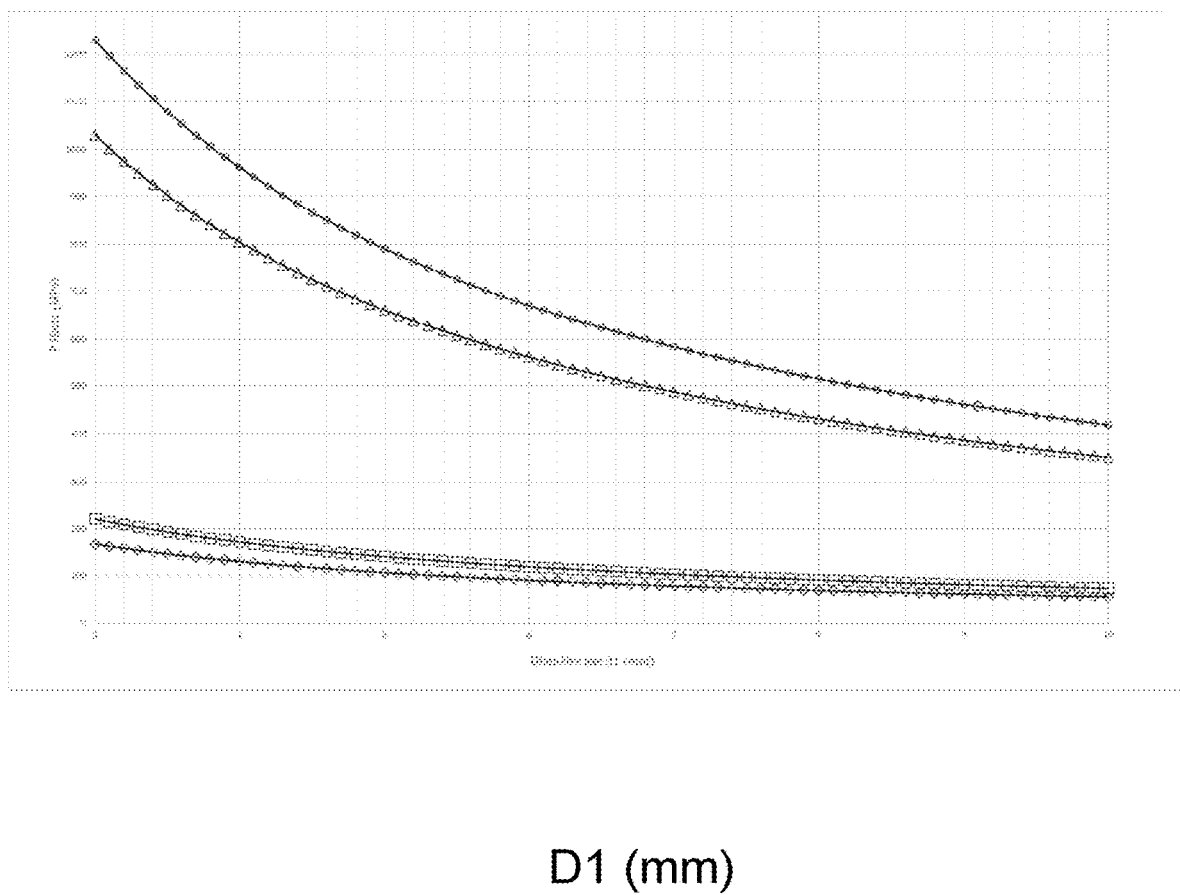
FIG. 7 is a graph showing the developments of the contact pressure P (or Hertz pressure) in MPa according to the diameter D1 of the shaft in mm for steel shafts in contact with planet wheels made of steel (rounds), for steel shafts in contact with rings made of brass of planet wheels (triangles), for metal shafts in planet wheels made of PEEK material (squares) and for bi-material shafts sheathed with PEEK in planet wheels made of PEEK material (lozenges).

The choice of the minimal diameter of the shaft 16 making it possible to decrease the contact pressure substantially according to the material can be determined from a graph of the type represented in FIG. 7.

This graph shows the Hertz pressure (in contact) according to the diameter of the shaft 16 for three pairs of materials (shaft-planet wheel) for a gear reducer 2 fitted in the crank gear 102, the offsetting $e_x$ of which is set to 0.7 mm, and a difference of diameter of 1.4 mm between the shafts 16 and the cylindrical holes 31 of the planet wheels 12, 13.

It is found in this graph that, for all the pairs of materials, the contact pressure decreases as the diameter D1 of the shaft 16 increases.

It is also found that the contact pressures are very high for shafts made of steel in contact with planet wheels made of steel (rounds), as well as for shafts made of steel in contact with rings made of brass fitted in the holes of the pinions (triangles) because of the high Young's moduli of the metals (more than 200 GPa for steel, 100 to 130 GPa for brass). These contact pressures remain high despite the increase in the diameter D1 of the shaft 16.

On the other hand, the contact pressures are far lower for metal shafts 16 in pinions made of PEEK material (square) and even lower for PEEK sheathed bi-material shafts 16 in PEEK planet wheels 12, 13 (lozenges).

Once the material has been selected, the diameters of the shafts 16 can be determined on the basis of the graph, such as to lower the contact pressure as far as possible while having admissible dimensions in the size of the gear motor 1.

In order to ensure the pivot connection of the shafts 16 relative to the flanges 17, 18, the gear motor 1 can also comprise a pair of shaft bearings 33 per shaft 16, with a shaft bearing 33 being fitted at each cylindrical end of the shafts 16, in particular on the metal needle 32 which passes through the shaft 16 in the case of bi-material shafts 16 (FIG. 3). There are thus twelve small shaft bearings 33 received in the flanges 17, 18 of the satellite-carrier 11 of the gear motor 1 illustrated.

The shaft bearings 33 make it possible in particular to ensure that the shafts 16 roll without sliding in the holes 31 of the at least one planet wheel 12, 13. In fact, the shafts 16 roll without sliding if the product of the coefficient of static friction f1 at the interface between the shaft 16 and the hole 31 times the diameter D1 of the shaft 16 (i.e. f1×D1) is greater than the product of the coefficient of static friction $\mu$ of the shaft bearings 33 times the mean diameter Dm of the bearings (i.e. (Outer diameter+Inner diameter)/2×$\mu$). However, $\mu$, the coefficient of static friction of the bearings is very low, generally between 1 and 2 thousandths, whereas that of the shafts 16 (f1) is approximately 0.2, which makes it possible to ensure that the equation f1×D1>$\mu$×Dm applies.

In addition, shouldered shafts 16 with an intermediate diameter D1 which is greater than the diameters D3 of the cylindrical ends makes it possible to increase the intermediate diameter D1 in order to decrease the contact pressure, while having shaft bearings 33 with small dimensions.

The shaft bearings 33 can be fitted clamped at each cylindrical end of the shaft 16, and abutting axially the sheath 29 made of polymer material, on both sides of the sheath 29, in the case when the sheath 29 made of polymer material does not cover the cylindrical ends of the metal needle 32. This fitting makes it possible to ensure very good axial retention of the sheath 29, and makes it possible to avoid any contact wear between the shaft 16 and the inner rings of the shaft bearings 33.

According to another embodiment, the shafts 16 are made entirely of polymer material. They are "in a single piece".

The polymer material of the shaft can be fibre-reinforced in order to reinforce its mechanical strength, for example with carbon fibres or glass fibres. The modulus of elasticity of the fibre-reinforced polymer material can then be approximately 10000 MPa.

The other characteristics of this variant embodiment are similar to the characteristics previously described. In particular, the shafts 16 which are entirely made of polymer material can be shouldered in order to decrease the contact pressure by reduction of the relative difference of diameters between the shaft 16 and the cylindrical hole 31 at the level of the peripheral surface 30 of the shafts 16. The diameter D1 of the peripheral surface 30 of the shafts 16 is for example 1.4×D3 or more, the diameter of the cylindrical ends of the shaft 16.

In addition, in the case when the gear reducer 2 comprises two or three planet wheels, the mechanical actions of the planet wheels 12, 13 on the shafts 16 which transfer the torque to the satellite-carrier 11 induce strong flexure stresses on the shafts 16 (bending moment for two pinions) and these stresses can be better withstood by shouldered shafts 16 because of the increase in diameter in the central area.

Figure 8:
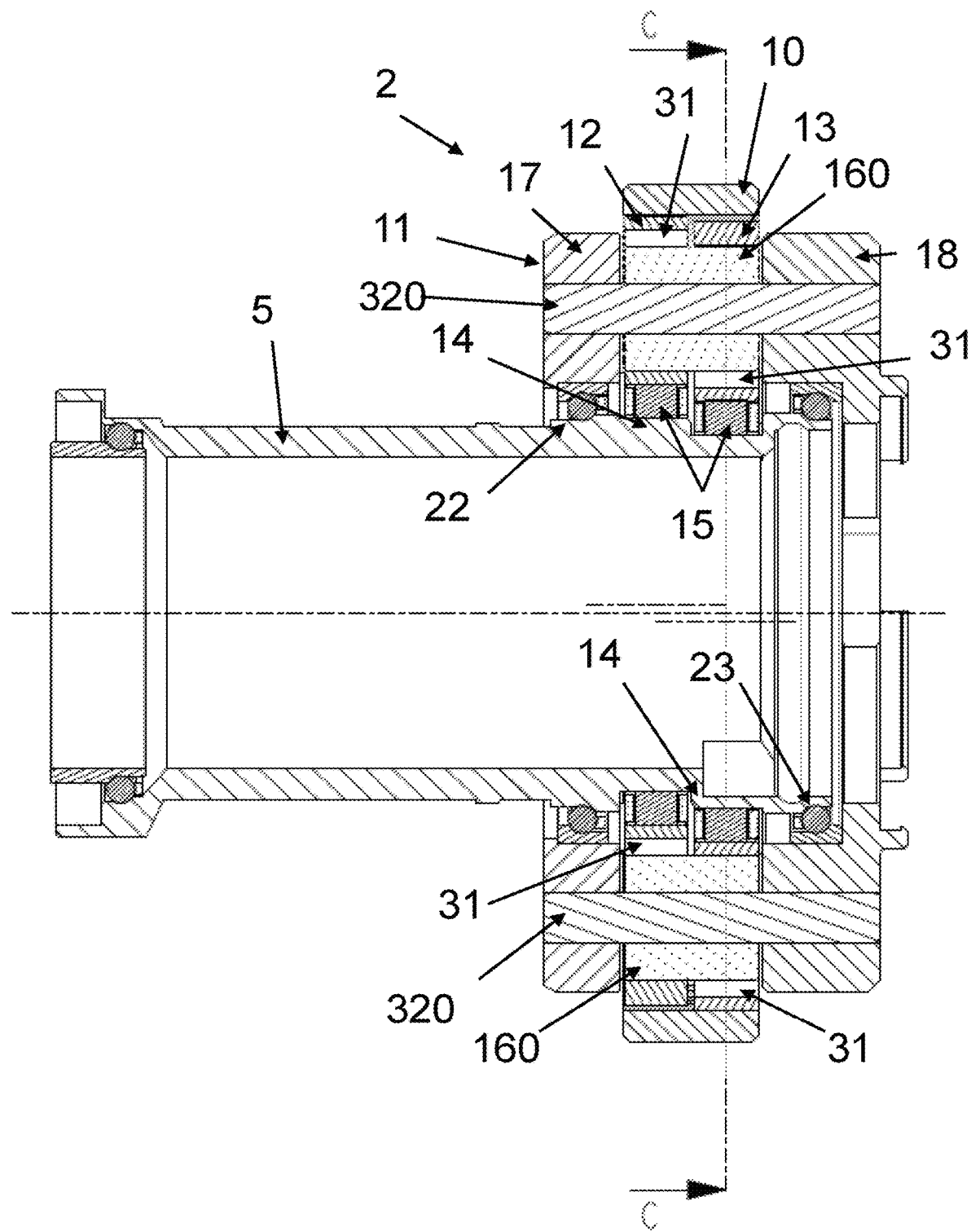
FIG. 8 shows a view in axial cross-section of elements of a gear motor according to another embodiment.
Figure 9:
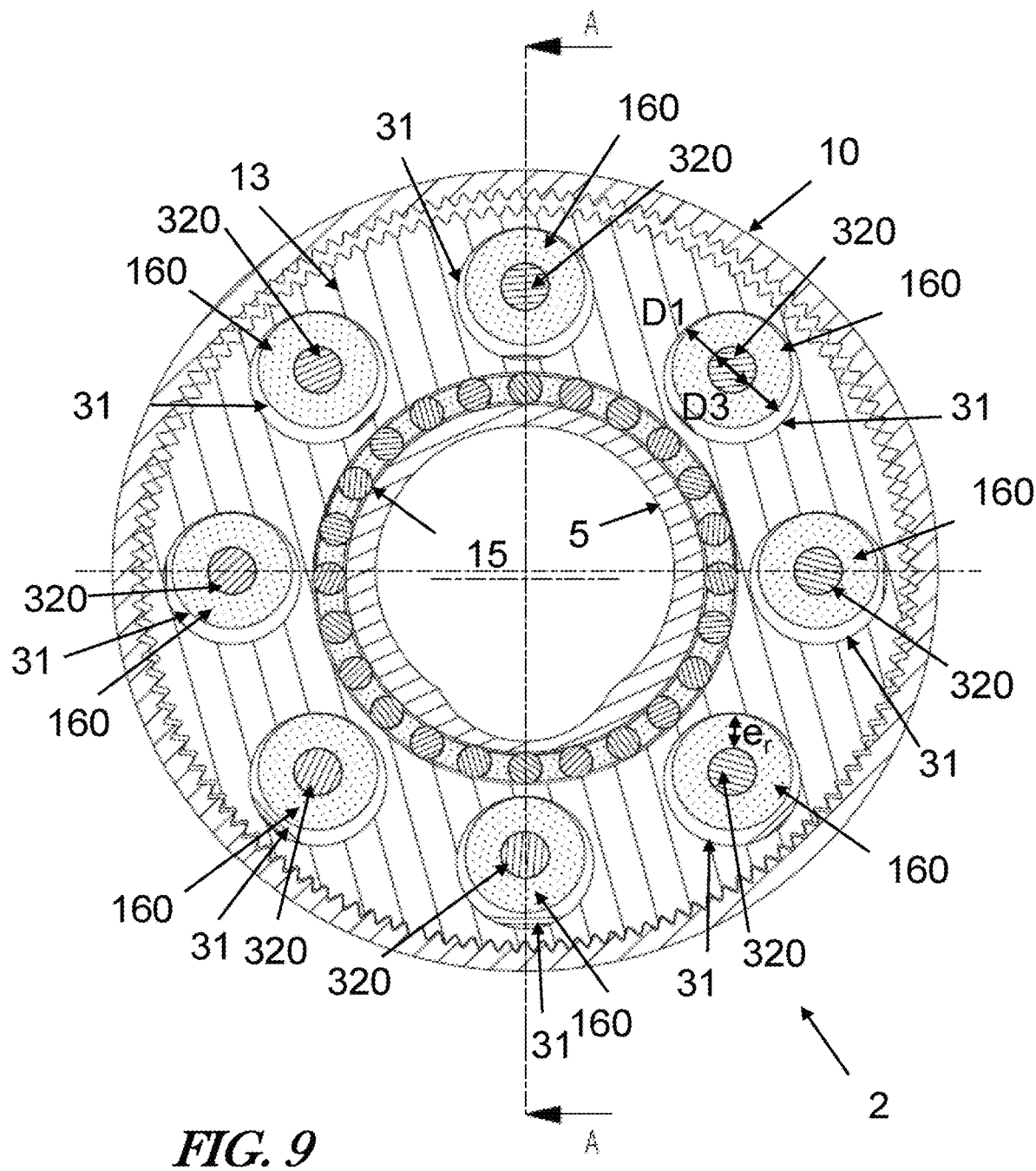
FIG. 9 shows a view in transverse cross-section of the elements of FIG. 8.

FIGS. 8 and 9 show another embodiment of the gear reducer 2.

In this second embodiment, the at least one planet wheel 12, 13 has at least three hollow cylinders 160 of the satellite-carrier 11 passing through it, which are fitted such as to pivot around a cylindrical section 320 of the satellite-carrier 11.

The cylindrical sections 320 are integral with the at least one flange 17, 18 of the satellite-carrier. The cylindrical sections 320 are for example embedded, for example fitted clamped, in each of the two flanges 17, 18 of the satellite-carrier 11. The axial distance between the two flanges 17, 18 of the satellite-carrier 11 can for example be adjusted by tooling during the clamped fitting of the cylindrical sections 320, by limiting the axial insertion course.

The satellite-carrier 11 can also comprise only a single flange 18 fitted projecting (not represented).

The hollow cylinders 160 are delimited by two coaxial cylinders, with an outer cylinder forming the peripheral surface 30, and an inner cylinder forming a through-hole. Each hollow cylinder 160 is coaxial with a respective cylindrical section 320.

The peripheral surface 30 of the hollow cylinders 160 is configured to come into contact with a respective hole 31 of the planet wheel 12, 13.

Each hollow cylinder 160 is made of polymer material. The polymer material is for example a thermoplastic or a thermosetting polymer material.

Each hollow cylinder 160 can be configured to roll without sliding in the holes 31 of the planet wheel 12, 13. The hollow cylinders 160 roll without sliding if the product of the coefficient of static friction f1 at the interface between the hollow cylinders 160 and the holes 31 times the outer diameter D1 of the hollow cylinders 160 (i.e. f1×D1) is greater than the product of the coefficient of static friction f3 at the interface between the interior of the hollow cylinders 160 and the cylindrical sections 320 times the diameter D3 of the cylindrical sections 320 (i.e. f3×D3). For security, f1×D1>1.2×f3×D3 can be applied.

A radial functional gap of a few hundredths of millimetres is left between the cylindrical section 320 and the hollow cylinder 160 made of polymer material, in order to permit the free rotation of the hollow cylinder 160 forming a smooth bearing. The hollow cylinder 160 thus ensures a function of a bearing in addition to the function of a damping roller, in order to reduce the vibrations and noise emitted in its contact without sliding with the at least partly cylindrical holes 31 of each of the planet wheels 12, 13. This embodiment has the advantage of not needing the two shaft bearings 33 (FIG. 8), with the hollow cylinder 160 being able to pivot around a respective cylindrical section 320 because of the smooth bearing.

The hollow cylinders 160 can have respectively a peripheral surface 30 with a diameter D1 which is equal to, or greater than, the product of the inner diameter D3 of the hollow cylinder 160 times 1.4.

The ratio D1>1.4*D3, or in other words a radial thickness $e_r$ greater than $0.2 \times D3$ (since $e_r = (D1-D3)/2$), makes it possible to define a minimal thickness of hollow cylinder which makes possible a height of damping sufficient for reduction of the noise.

The radial thickness $e_r$ of the hollow cylinder 160 is for example greater than 1 mm. It can be less than 6 mm, such as, for example, less than 3 mm.

The cylindrical section 320 has for example an (outer) diameter D3 of 4 mm, the hollow cylinder 160 has an (outer) diameter D1 of 7.6 mm, and the radial thickness $e_r$ of the hollow cylinder 160 is thus 1.8 mm, i.e. in this case D1=1.9×D3.

With a larger diameter D1 of peripheral surface 30 made of polymer or thermoplastic material, the contact pressure is decreased, firstly by increasing the radius of curvature in contact, and secondly by decreasing the modulus of elasticity of the material, with these two factors combined resulting in a solution which is advantageous in terms of wear and noise generated.

Thus, the combination of the increase in the diameter of the hollow cylinder 160 combined with the use of polymer material makes it possible to reduce the contact pressure considerably, while creating a very compact and robust connection.

Since the braces 19 of the preceding embodiments, connecting the two flanges 17, 18 of the satellite-carrier 11 are no longer necessary, it is then possible to increase easily the number of hollow cylinders 160 in the same size of gear reducer 2.

The planet wheels 12, 13 comprise for example eight respective holes 31, the gear reducer 2 comprising eight hollow cylinders 160, a hollow cylinder 160 being in contact with a respective hole 31 of each pinion 12, 13 (FIG. 9). The increase in the number of hollow cylinders 160 makes it possible to limit their unit load and thus limit their wear.

This embodiment is very economical, but the performance of the gear reducer 2 may be downgraded as a result of the losses generated by the friction of the smooth bearings.

The other characteristics of this second embodiment are similar to those of the first embodiment.

According to another embodiment not represented, the crown is coupled in rotation to the output of the gear reducer. In this embodiment, it is the satellite-carrier 11 which is secured on the housing 7 of the gear motor 1.

Figure 10:
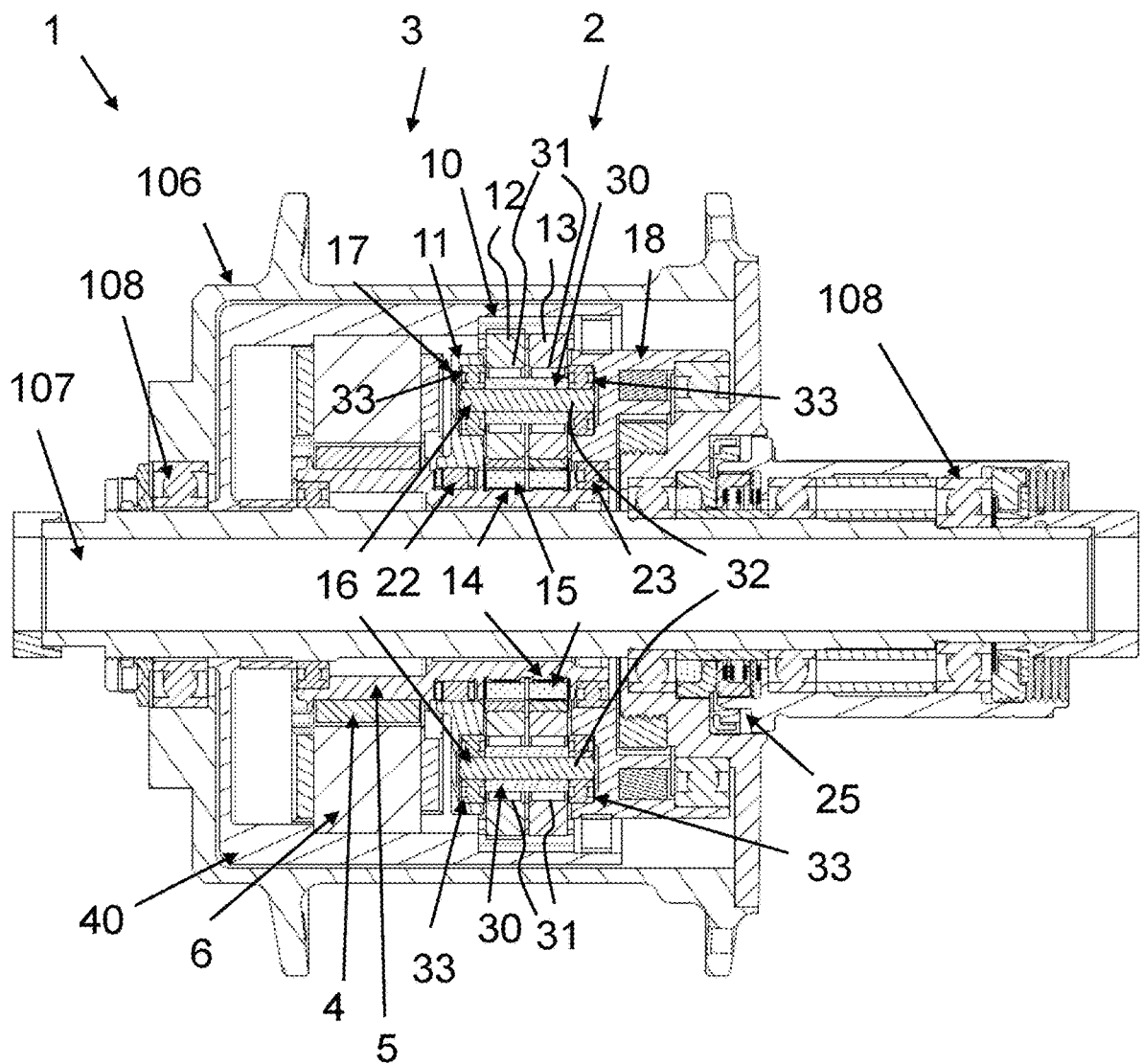
FIG. 10 shows a view in axial cross-section of a gear motor fitted in a rear hub of the cycle.

FIG. 10 shows a gear motor 1 produced according to another embodiment.

In this example, the gear motor 1 is fitted in a rear hub 106 of the cycle, on the central shaft 107 of a cycle wheel. The rear hub 106 is assembled, and rotates around the central shaft 107 via bearings 108.

The gear reducer 2 and the electric motor 3 are fitted coaxially on the central shaft 107.

The stator 6 of the electric motor 3 is secured in a bell housing 40 of the gear motor 1, the annular base of the bell housing 40 being secured on the central shaft 107, the other end being open.

In a first possible configuration represented in FIG. 10, the satellite-carrier 11 is coupled in rotation to the output of the gear reducer 2.

In this case, the toothed crown 10 is secured on the bell housing 40 of the gear motor 1. The toothing of the crown 10 is for example produced directly in the bell housing 40. The planet wheels 12, 13 are engaged on the "fixed" toothed crown 10.

The shafts 16 passing through the faces of the planet wheels 12, 13 form the output of the gear reducer. The shafts 16, or output shafts in this case, rotate the output of the gear reducer 2 coaxially with the shaft 5 when the planet wheels 12, 13 rotate. The direction of rotation of the planet wheels 12, 13 and of the output is opposite that of the shaft 5.

The same advantages apply of decreasing the contact pressure between the shafts 16 and the planet wheels 12, 13, whether the gear motor 1 is fitted in the crank gear 102, or in the rear hub 106.

The difference between the diameters D2 of the cylindrical holes 31 of the planet wheels 12, 13 and the diameters D1 of the shafts 16 passing through them at the level of the peripheral surface 30 can be 3 mm when the gear motor 1 is fitted in the rear hub 106 of the cycle. In fact, in the illustrative example, the off-centring $e_x$ is 2.5 mm instead of 1.4 mm when the gear motor 1 is fitted in the crank gear 102, since in this case the reduction ratio can be smaller (for example in this case the reduction ratio is 1/22).

According to another possible configuration not represented, the crown is coupled in rotation to the output of the gear reducer. In this embodiment, it is the satellite-carrier 11 which is secured on the bell housing 40 of the gear motor 1.

The other characteristics of this embodiment are similar to the first embodiment previously described.

The invention claimed is:

1. A gear motor of an electrical assistance device for a cycle, comprising:
    a gear reducer and an electric motor, which are configured to be fitted coaxially on a central shaft,
    the electric motor comprising a rotor, which is integral in rotation with a shaft forming the input of the gear reducer, and
    the gear reducer comprising:
        a toothed crown,
        a satellite-carrier comprising at least one flange, and
        at least one planet wheel, which is fitted firstly on an eccentric cam via a bearing, the eccentric cam being integral with the shaft, the at least one planet wheel also having passing therethrough at least three shafts of the satellite-carrier, which are fitted so as to pivot relative to the at least one flange, the at least one planet wheel engaging on the toothed crown,
    wherein the at least three shafts comprise a respective peripheral surface coaxial with an axis of rotation of the shaft, which surface is configured to come into contact with a hole of the at least one planet wheel, and is made of polymer material, and/or the at least one planet wheel is made of polymer material, the at least three shafts being shouldered and having respectively a peripheral surface with an intermediate diameter greater than a diameter of cylindrical ends thereof, the intermediate diameter of the peripheral surface of the at least three shafts being greater than or equal to a product of 1.4 times the diameter of the cylindrical ends of the at least three shaft.

2. The gear motor according to claim 1, wherein the peripheral surface of each shaft of the at least three shafts is configured to roll without sliding in the hole of the at least one planet wheel.

3. The gear motor according to claim 1, wherein the polymer material of the peripheral surfaces of the at least three shafts and/or of the at least one planet wheel is a thermoplastic material or a thermosetting polymer.

4. The gear motor according to claim 1, wherein each shaft of the at least three shafts is a bi-material shaft comprising a central metal needle, sheathed at least on the peripheral surface by a sheath made of polymer material.

5. The gear motor according to claim 4, wherein the central metal needle is made of steel.

6. The gear motor according to claim 4, wherein a radial thickness of the sheath is greater than 0.5 mm.

7. The gear motor according to claim 4, wherein a radial thickness of the sheath is greater than 1 mm.

8. The gear motor according to claim 4, wherein the sheath made of polymer material forming the peripheral surface of said each shaft of the at least three shafts is over-moulded onto the respective central metal needles.

9. The gear motor according to claim 8, wherein the sheath made of polymer material over-moulds only the peripheral surface, leaving cylindrical ends of the metal needle on view.

10. The gear motor according to claim 8, wherein the sheath made of polymer material over-moulds entirely an outer surface of the respective central metal needles as far as cylindrical ends of the respective central metal needles.

11. The gear motor according to claim 4, wherein the sheath made of polymer material forming the peripheral surface of the at least three shafts is fitted shrunk onto the respective central metal needles.

12. The gear motor according to claim 1, wherein the at least three shafts are made entirely of polymer material.

13. The gear motor according to claim 1, further comprising a pair of shaft bearings per shaft, a shaft bearing being fitted at each cylindrical end of the at least three shafts.

14. The gear motor according to claim 4,
    further comprising a pair of shaft bearings per shaft, a shaft bearing being fitted at each cylindrical end of the at least three shafts,
    wherein the shaft bearings are fitted clamped at each cylindrical end of the at least three shafts and axially abutting the sheath made of polymer material, on both sides of the sheath.

15. The gear motor according to claim 1, wherein the at least one planet wheel is made of metal.

16. The gear motor according to claim 15, wherein the metal is steel or brass.

17. A cycle, comprising:
    an electrical assistance device comprising a gear motor according to claim 1, configured to be fitted in a crank gear of the cycle, on a central shaft of the crank gear or in a rear hub of the cycle, on a central shaft of a cycle wheel.

* * * * *